E. ROBERTS.
METER FOR MEASURING THE FLOW OF LIQUIDS.
APPLICATION FILED DEC. 1, 1914.

1,234,392. Patented July 24, 1917.
3 SHEETS—SHEET 1.

Witnesses:
Eloise Lawrence
Agnes M. Shea.

Inventor:
Eugene Roberts
by Geo. N. Goddard atty

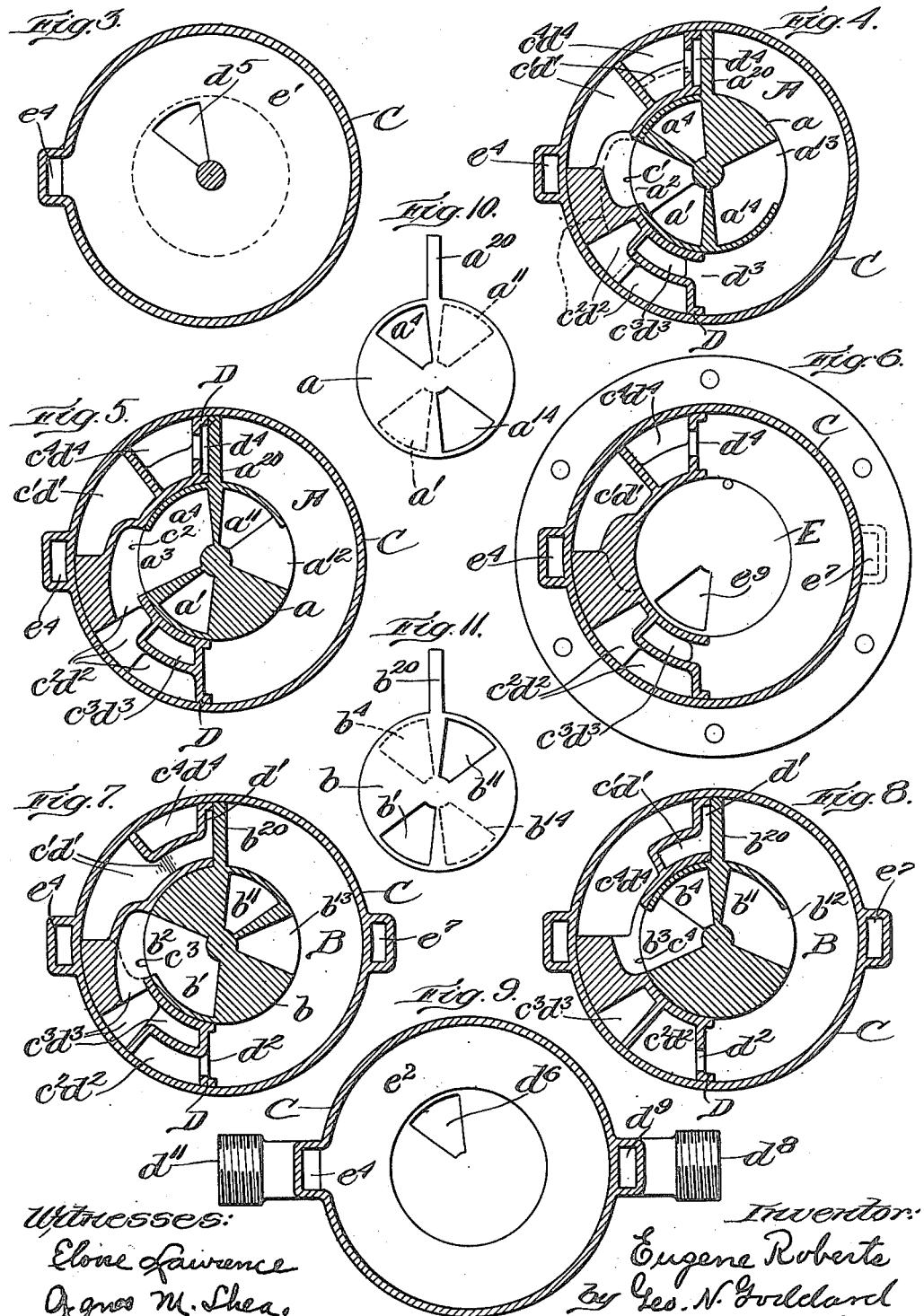

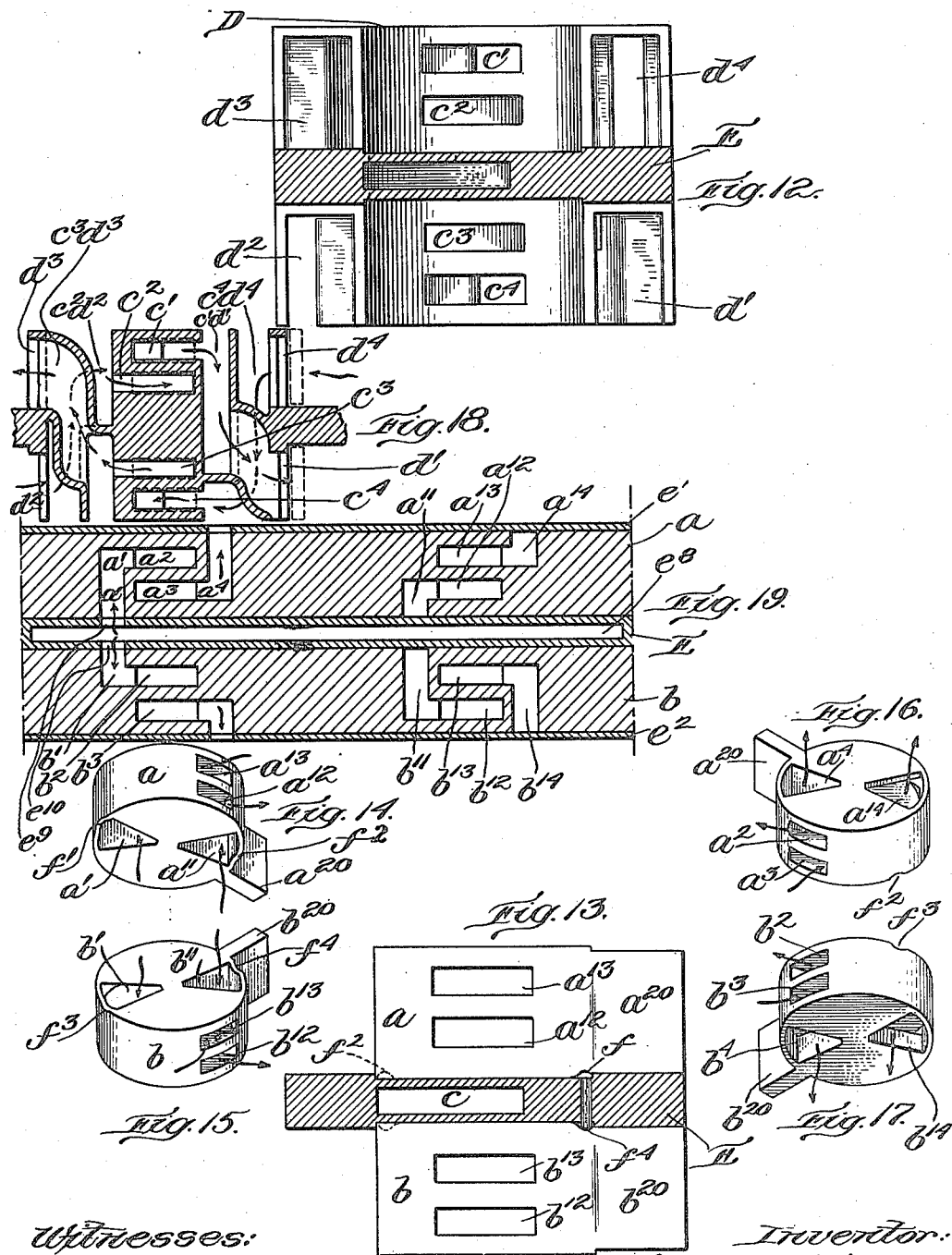

UNITED STATES PATENT OFFICE.

EUGENE ROBERTS, OF SALT LAKE CITY, UTAH.

METER FOR MEASURING THE FLOW OF LIQUIDS.

1,234,392.  Specification of Letters Patent.  Patented July 24, 1917.

Application filed December 1, 1914. Serial No. 874,933.

*To all whom it may concern:*

Be it known that I, EUGENE ROBERTS, citizen of the United States, and resident of Salt Lake City, Utah, have invented certain new and useful Improvements in Meters for Measuring the Flow of Liquids, of which the following is a specification.

This invention relates to improvements in meters for measuring the flow of liquids, and is intended to provide a simple, compact, and reliable mechanism which will interfere to the least possible extent with the flow of liquid while constituting a reliable and positive measuring device capable of actually measuring the liquid passing through it whether there is a full, or only a partial flow of liquid passing through.

The present invention is characterized by two co-axially arranged oscillatory pistons working in separate piston-chambers, each piston acting alternately to control the inflow and out-flow of water in the other piston-chamber. By using oscillatory pistons, arranged co-axially, it is possible not only to use relatively large and short communicating passages, thereby increasing the capacity of the device, but it, also, enables me to employ a very simple interlocking device by which each piston is alternately locked in fixed position until the other piston has completed its traverse and come to that position of rest in which it controls the flow of water through the chamber of the other piston. This locking of one piston in position while the other piston is moving is of great practical importance and forms one of the chief features of the present invention.

In the accompanying drawings, I have illustrated a simple form of device embodying the principles of this invention.

Figure 2:
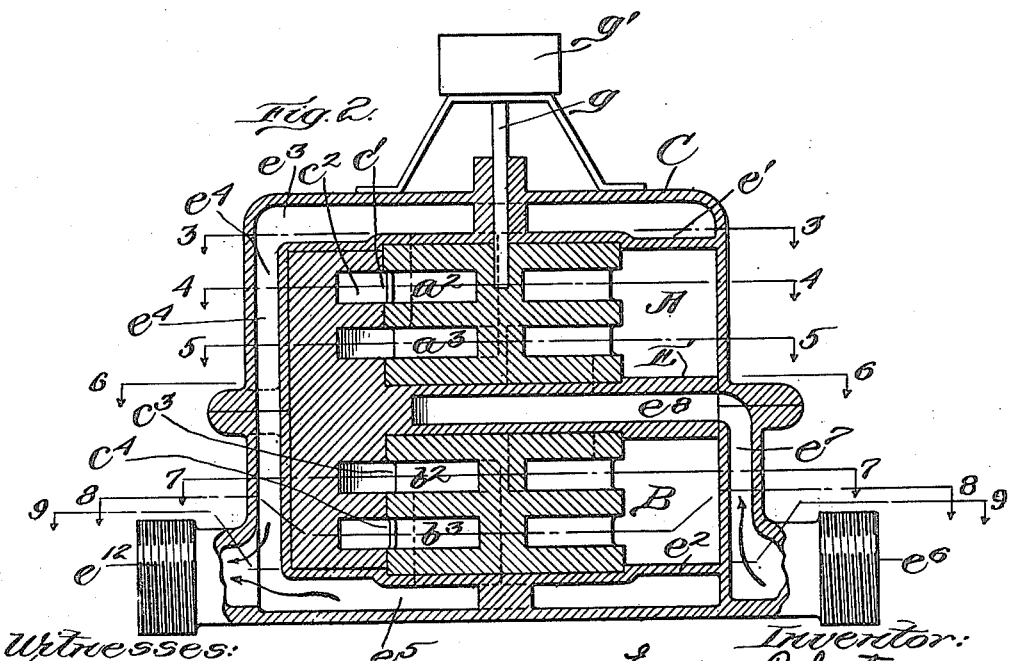
Fig. 2 is a central vertical section intersecting the inlet and the outlet pipes.

Figs. 3 to 9, inclusive, are plan views on the sectional planes indicated by section lines correspondingly numbered on Fig. 2.

Figs. 10 and 11 are detail plan views of the respective piston members.

Fig. 12 is a vertical section on the line 12—12 (Fig. 1), the outside casing being omitted.

Figure 1:
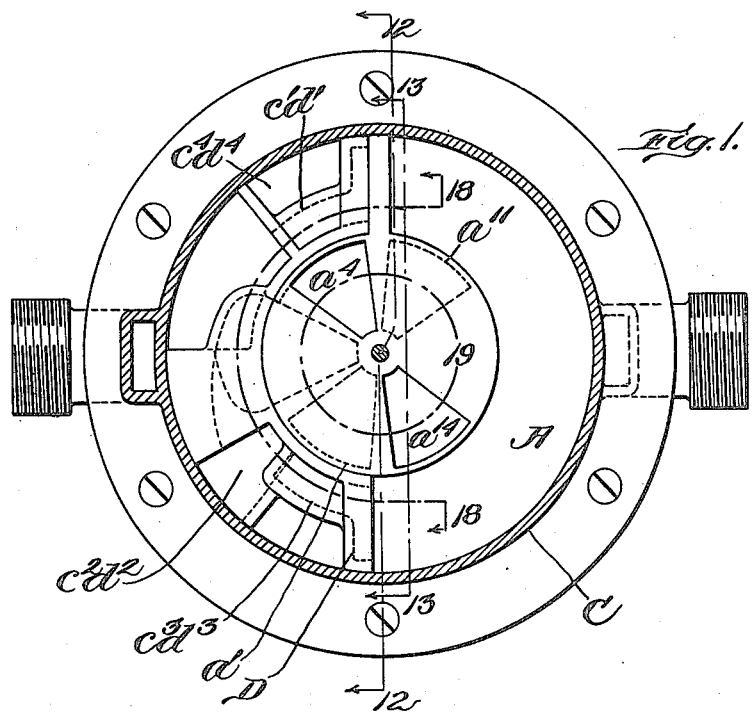
Figure 1 is a plan view partly in section showing the upper piston member in operative position, the top of the casing and the uppermost partition wall being removed.

Fig. 13 is a vertical section of the middle horizontal diaphragm, or partition, on the plane 13—13 (Fig. 1).

Figs. 14 to 17, inclusive, are detail views in perspective of the two piston members.

Figs. 18 and 19 are flat or unfolded developments of the casing and of the piston plugs respectively on circular sections 18 and 19, as indicated on Fig. 1.

In the practice of my invention, according to the form herein shown and described, I provide a substantially cylindrical casing C which is divided into upper and lower semi-circular piston chambers A and B by a transverse partition E and by a vertical partition D. Additional horizontal partitions $e'$ and $e^2$ form, in connection with the middle partition E horizontal boundary walls of the piston chambers A and B respectively, and serve to separate said piston chambers respectively from the off-take, or outlet chambers $e^3$ $e^5$, which communicate with the off-take pipe $e^{12}$.

As will be hereinafter explained, the diaphragm, or partition $e'$, as shown in Fig. 3, is provided with a substantially triangular port $d^5$, which, through the medium of ports in the upper piston $a$ and passages in the vertical partition wall D, allows the outflowing water from chamber B to pass into the off-take passage $e^3$. Similarly, partition $e^2$ has a port $d^6$, through which the off-take water expelled from piston chamber A through passages in the wall D and in the piston B, passes into the off-take chamber $e^5$.

The pistons $a$ and $b$ comprise cylindrical plugs formed with suitably arranged ports and passages for the flow of water as hereinafter described, and each has a wing, or piston blade, $a^{20}$ and $b^{20}$ respectively, which alternately traverse their respective piston chambers A and B expelling the water in front of them as they advance and making room for the water to flow in to their piston chambers behind them as they move forward. In each case the piston is moved by the pressure of water behind it to expel the water in front of the actuating stream and the out-flow of the expelled stream of water is controlled by the other piston which remains stationary until the moving piston has reached the end of its traverse, at which point the first piston coming to rest is then in a position to admit water through the wall D behind the face of the other piston, and at the same time to open an outlet for the flow of water expelled from the other piston chamber.

The cylindrical plugs forming the piston members, as seen most clearly in Fig. 2, are mounted in circular recesses formed in the diaphragms E, $e'$ and $e^2$, which recesses receive the ends of the pistons and form a socket, or bearing, which keeps them against lateral displacement, thus dispensing with the use of any separate pintles or journals.

The water to be measured enters the casing through the connection $e^6$, passes up through the vertical passage $e^7$ in the casing into the passage $e^8$ formed in the horizontal diaphragm E. At its farther end, somewhat beyond the center, the passage $e^8$, is provided with an upward outlet port $e^9$ leading to the upper piston $a$, and, also, with a lower port $e^{10}$ leading to the piston $b$, these two ports being in vertical alinement with each other and their position being indicated in Fig. 1 by dotted line $a'$. With the pistons in the position shown in Fig. 1, and, also, in Figs. 4 and 5, the bottom port $a'$ in the piston $a$ will register with the inlet port $e^9$ to allow the water to flow through the port $a'$ and escape through the upper lateral port $a^2$, with which port $a'$ is connected. From this port $a^2$ the water flows into the registering port $c'$ formed in the casing, whence it descends through passage $c'$ $d'$ to port $d'$, against which the wing $b^{20}$ of the piston $b$ is then resting, and its pressure forces piston $b$ around in a clock-wise direction, thus expelling the body of water which fills the chamber B.

The out-flowing water from chamber B escapes through port $d^2$ in the wall D, passes upwardly and partly in a circumferential direction, through the port $c^2$ into the lower lateral port $a^3$ of the piston member $a$, which port $a^3$ is in connection with the outlet port $a^4$ in the top of the member $a$, which outlet port is then in alinement with the off-take port $d^5$ in the top of the diaphragm $e'$ (see Fig. 3). So long as the piston $a$ remains in the position shown, it, therefore, affords a passage for the flow of the in-coming water against the rear face of the wing $b^{20}$ of member $b$, and, also, affords an outlet for the water expelled in front of said piston wing $b^{20}$.

This movement of piston $b$ terminates when its wing $b^{20}$ reaches the end of its clock-wise traverse against the face of the wall D. On reaching this point, the piston is then in position to have its top inlet port $b^{11}$ register with the inlet port $e^{10}$ leading downward from the inlet passage $e^8$ in the diaphragm E. The in-coming water flows through the port $b^{11}$ and out of the lower lateral port $b^{12}$ into the registering port $c^4$ formed in the wall D, from which port it passes through the passage $c^4$ $d^4$ to the port $d^4$ leading into the right hand side of the piston chamber A. The water entering through the port $d^4$ pushes the piston $a$ in a clock-wise direction toward the left hand side, and the water expelled through port $d^3$ at the left hand side, passes along the passage $c^3$ $d^3$ to port $d^3$, which registers with the upper port $b^{13}$ which is in communication with the bottom off-take port $b^{14}$ formed in piston $b$, registering with off-take port $d^6$, formed in the bottom diaphragm $e^2$.

When the piston $a$ reaches the end of its clock-wise traverse, its other inlet port $a^{11}$ will then register with the inlet port $e^9$ to allow the water to flow through and out of port $b^{12}$ into port $c^2$ and through passage $c^2$ $d^2$ to the port $d^2$, through which it passes behind the piston $b^{20}$ pushing it in the reverse direction to expel the water in chamber B through port $d'$ and passage $c'$ $d'$ through port $c'$ into port $a^{13}$ and out through the top port $a^{14}$ of the member $a$, whence it escapes through port $d^5$ into passage $e^3$ and $e^4$ to the exit $e^{12}$, thus completing the third stage or traverse of the cycle.

Piston $b$, on reaching the end of its contra-clock-wise traverse then has its port $b'$ in register with the port $e^{10}$ to allow the inflowing water to pass through the member $b$ and out of the lateral port $d^2$ into port $c^3$ and through passage $c^3$ $d^3$ into the left hand end of chamber A through port $d^3$ in order to move piston $a$ back in a contra-clock-wise direction to its original position, shown in Fig. 12. The water expelled in front of the piston in this movement passes through port $d^4$ and through passage $c^4$ $d^4$, through port $c^4$ into port $b^3$ and out of lower port $b^4$ through port $d^6$ into the bottom outlet chamber $e^5$.

It will be understood that if through jarring or leakage the two pistons should become displaced in relation to each other so that each of them should stand at some intermediate point in the traverse, the apparatus would be dead-locked and useless. It is, therefore, of the highest importance to make provision for preventing any such occurrence. In this case I have devised a simple expedient for retaining or locking one piston at the end of its traverse, from which position it can be released only when the other piston also reaches the end of its traverse. To this end, I have provided a vertically movable pin $f$ of somewhat greater length than the thickness of the diaphragm E, in which the pin is mounted at a slight distance from one end of the piston chambers A B. On opposite sides of the bottom face of the cylindrical plug $a$ are formed shallow notches $f'$ $f^2$, and on opposite sides of the top face of the piston $b$ are formed similar notches $f^3$ $f^4$ so disposed as to remain in alinement with the pin $f$. These notches are in the form of shallow scallops with inclined, or sloping, faces which serve to force the pin $f$ up or down as they ride over the pin. When both pistons are at either end of their traverse, the pin will be in alinement with the notch above it and with the notch below it so that it will be free to move up or down by whichever piston first moves away from the end of its traverse. Suppose in this position, the upper piston moves away from the end of its traverse, it will be clear that in doing so it will depress the pin by the inclined face of its notch so that the lower end of the pin will project into locking engagement with the notch in the upper face of the lower piston. From that point on until it reaches the opposite end of its traverse, the plain, or un-notched bottom surface of the piston will keep the pin in its depressed position, and so long as the pin remains in that position the lower piston can not be moved out of position. When, however, the upper piston has reached the farther end of its traverse the opposite notch then comes in register above the pin $f$ so that the movement of the lower piston acts by means of the inclined face of its registering notch to raise the pin $f$ into locking engagement with the superimposed notch of the upper piston. During the further traverse of the lower piston its un-notched surface keeps the pin in raised position against any accidental movement or displacement. It will, therefore, be seen that so long as both pistons remain at the extreme end of their traverse, the pin will allow either of them to move, but as soon as one of them has moved through a small arc, the other is immediately locked against movement until the moving piston reaches the end of its traverse. In other words, the moving piston itself, through the medium of the locking or retaining pin, serves to retain the other piston in register with the proper inlet and outlet passages to control and complete the traverse of the moving piston.

It will be noticed that the ports $d^3$ $d^4$ extend down fully to the level of the top surface of the diaphragm E which forms the floor of the top chamber so that any sediment is brushed, or pushed, along by the piston wing directly into the off-take passage, and that the ports $d'$ $d^2$ are similarly free from any obstruction or ridge that would tend to accumulate sediment and clog the device. In other words, with the arrangement of exhaust ports from the piston chambers there can be no accumulation or clogging of the device, which is important in view of the prevalence of sediment in ordinary municipal water supply. With this arrangement, the device becomes self-clearing, since all sediment is pushed directly into the off-take passage and is carried off by the running water.

To register the oscillations of the upper piston, I provide a pin, or shaft $g$, which passes down into the casing and is fixed in a socket formed centrally of the member $a$ and whose upper end operates any suitable type of register or dial mechanism indicated conventionally at $g'$.

It will, of course, be understod that the register, or indicator, should be adjusted to correctly indicate on its dial the cubical displacement effected by the oscillations of the pistons.

Owing to the coaxial arrangement of the pistons, a device of great compactness in proportion to its capacity is provided, while, at the same time, making room for relatively short connecting passages of ample diameter to accommodate the flow of liquid without noticeably checking it. The exhaust and in-flow continue up to the very instant that the traverse of one piston ceases while, at the same time, the other piston starts, even slightly before the companion piston has come to rest. The flow through the meter is, therefore, continuous and uninterrupted. Furthermore, as the displacement is absolutely positive throughout, it is possible to obtain some accuracy of measurement, even when the flow of liquid through the meter is only a small fraction of a full flow.

What I claim is:

1. A water meter embracing in its construction a casing divided by longitudinal partitions into inlet and outlet divisions, and having a transverse partition to form two separate piston chambers, coördinated piston members mounted in the respective chambers, each piston being provided with ports through which the in-flow and out-flow of the other piston chamber passes whereby the pistons are moved in succession to and fro in their respective chambers.

2. A water meter embracing in combination a casing whose interior is subdivided into piston chambers, a movable piston mounted in each chamber and movable under the pressure of the entering fluid to expel the fluid contained in said chamber, each piston and casing being provided with coördinated ports and passages whereby each piston in alternation, admits and expels water from its own chamber through ports in the other piston, and means for maintaining the proper operative relationship between the two pistons, substantially as described.

3. A water meter embracing in combination a casing subdivided into compartments forming coaxially arranged piston chambers, a piston mounted in each chamber and movable to and fro under the pressure of the entering fluid, the piston and the casing having coördinated ports and passages whereby each piston itself forms an automatic valve controlling the in-flow and out-flow of fluid in the other piston chamber, and locking means for holding each piston alternately at the end of its traverse until the other piston has substantially completed its traverse, substantially as described.

4. The combination of a casing, longitudinal partitions subdividing said casing into inlet and outlet compartments, a transverse partition subdividing the remaining space within the casing into piston chambers whose walls are provided with inlet and outlet passages, an oscillatory piston mounted in each chamber and comprising a hub portion formed with ports for the passage of water, and wings or vanes extending to the outer wall of the piston chamber, substantially as described.

5. The four-cycle valve mechanism for a water meter embracing a chamber subdivided into two separate piston compartments, and provided with inlet and outlet passages for the flow of water, separately movable pistons therein actuated alternately by the pressure of water admitted to the passages that are automatically opened and closed by the movement of the companion piston and an interlocking device which alternately holds one of the pistons against movement while the other is performing its traverse, substantially as described.

6. A water meter embracing a casing subdivided into two substantially semi-circular compartments, arranged co-axially one above the other, and separated by a transverse partition, an oscillatory piston mounted in each of said compartments, said casing and said pistons being provided with coördinated ports and passages so arranged that each piston while remaining at either end of its traverse forms a valve to admit water behind the companion piston and cause it to revolve upon its axis and expel in advance of itself the water contained in its piston compartment, substantially as described.

7. The combination of the casing provided with three transverse partitions subdividing the casing into upper and lower piston compartments, the said partitions being each formed with coaxial bearing recesses, an oscillatory piston mounted in each compartment, and comprising a cylindrical plug with a laterally projecting vane, the cylindrical plug having bearing engagement in the aforesaid recesses, the casing and the plugs being provided with coördinating passages for controlling the in-flow and out-flow of water in said compartments in alternation, substantially as described.

8. The combination of a casing subdivided into upper and lower coaxial compartments of substantially semi-circular form, an oscillatory piston comprising a cylindrical plug, and a laterally projecting vane mounted in each compartment, the casing and the cylindrical plugs being provided with coördinated ports and passages by which the admission and expulsion of water in each compartment alternately is effected, and controlled by the companion piston, substantially as described.

9. In a water meter the combination of a casing, a transverse partition subdividing the casing into upper and lower piston compartments, an oscillatory piston mounted in each compartment, the pistons and the casing being provided with coördinated ports and passages controlling the flow of water through said compartments in alternation, a locking member mounted in the transverse partition and movable alternately into locking engagement with each piston by engagement with the other piston to retain it at the end of its traverse until the companion piston has completed its traverse.

10. A water meter embracing in its construction a casing, a transverse partition subdividing the casing into coaxial piston compartments, an inlet passage formed in said transverse partition, and provided with oppositely arranged ports formed in upper and lower walls of said inlet passage, upper and lower oscillatory pistons mounted above and below said partition, and provided in their adjacent faces with inlet ports which alternately communicate with the respective ports formed in said partition, the casing being provided with off-take passages at its opposite ends, having ports corresponding to the ports in the opposed faces of the respective pistons, the casing being also provided with internal passages coördinated with passages in the pistons to establish communication alternately between the respective ports in the transverse partition and the outlet passages at the opposite ends of the casing, substantially as described.

11. The combination of a hollow casing provided with internal partitions arranged to form two coaxially disposed segmental piston chambers on one side of the casing and a series of inlet and outlet passages on the other side of the casing, an oscillatory piston member arranged in each casing and each having ports or passages for establishing communication between proper inlet and outlet passages in the casing and the piston chamber of its coöperating piston whereby each piston alternately is oscillated by the pressure of the liquid admitted through the other piston to expel the liquid from its own chamber, substantially as described.

12. The combination of a hollow casing having internal partitions to form a series of inlet and outlet passages and also to form two distinct piston chambers, an oscillatory piston member mounted in each chamber and extending entirely across the axial depth of said chamber, each piston member forming a valve for opening and closing the proper inlet and outlet passages to establish communication between the opposite ends of the companion piston chamber respectively with the inlet and outlet passages, substantially as described.

13. The combination of a hollow casing having a transverse partition sub-dividing it into co-axially arranged separate piston chambers provided with circularly curved peripheral walls, and having inlet and outlet passages for the flow of water, separately movable pistons mounted concentrically in the respective chambers to oscillate in alternation, each piston member being provided with ports arranged to coöperate with the appropriate inlet and outlet passages to control the flow of water into and out of the companion piston chamber, and a reciprocatory pin mounted in said partition so as to project alternately into the respective piston chambers into engagement with the respective pistons, said pin being actuated in opposite directions by alternate engagement with said pistons, each piston being provided with a notch or recess located to be engaged by the projecting end of said pin when the piston is at rest at the end of each traverse, substantially as described.

In witness whereof, I have subscribed the above specification.

EUGENE ROBERTS.

In the presence of—
 GEORGE F. KENNY,
 WM. C. SHERWOOD.